United States Patent [19]

Kawakami

[11] Patent Number: 5,065,160
[45] Date of Patent: Nov. 12, 1991

[54] RADAR TRANSPONDER
[75] Inventor: Youichi Kawakami, Hyogo, Japan
[73] Assignee: Mitsubishi Denki Kabushiki Kaisha, Tokyo, Japan
[21] Appl. No.: 413,581
[22] Filed: Sep. 28, 1989

Related U.S. Application Data

[62] Division of Ser. No. 327,133, Mar. 22, 1989, Pat. No. 4,980,689.

[30] Foreign Application Priority Data

May 12, 1988 [JP] Japan ................................ 63-1134575

[51] Int. Cl.$^5$ ............................................. G01S 13/80
[52] U.S. Cl. ....................................... 342/51; 361/398
[58] Field of Search ............................ 342/51, 44, 42; 361/397, 398; 330/66

[56] References Cited

U.S. PATENT DOCUMENTS

| | | | |
|---|---|---|---|
| 3,914,762 | 10/1975 | Klensch | 342/44 |
| 4,067,011 | 1/1978 | Althaus | 342/51 |
| 4,068,232 | 1/1978 | Meyers et al. | 342/44 |
| 4,121,102 | 10/1978 | Wilson | 342/44 X |
| 4,129,855 | 12/1978 | Rodrian | 342/44 X |
| 4,145,692 | 3/1979 | Armstrong et al. | 342/173 |
| 4,471,344 | 9/1984 | Williams | 342/42 X |
| 4,975,763 | 12/1990 | Baudoin et al. | 357/74 |
| 4,980,689 | 12/1990 | Kawakami | 342/51 |

Primary Examiner—John B. Sotomayor
Attorney, Agent, or Firm—Birch, Stewart, Kolasch & Birch

[57] ABSTRACT

This is a radar transponder in which an amplifying means using a FET amplifier is inserted between a receiving antenna and a detecting means. Further, the radar transponder has a receiving on/off control circuit which stops the operation of the amplifying means in transmitting a response signal in order to enhance the receiving sensitivity thereof. Also, the radar transponder mounts the amplifying means, and the detecting means via a metal body having resilience on an antenna housing. Each circuit unit of the radar transponder and connection wirings between each circuit unit are formed by flexible printed circuit boards.

10 Claims, 5 Drawing Sheets

RADAR TRANSPONDER

This application is a divisional of copending application Ser. No. 07/327,133, filed on Mar. 22, 1989 now U.S. Pat. No. 4,980,689.

BACKGROUND OF THE INVENTION

1. Field of the Invention

The present invention relates to a radar transponder which, on reception of a high frequency signal such as a microwave signal from a radar, responds to (synchronize with) the signal and transmits a high frequency response signal.

2. Description of the Prior Art

FIG. 1 is a circuit block diagram of a conventional radar transponder. In FIG. 1, reference numeral 1 is a receiving antenna, 2 a diode direct detector, 3 a video amplifier, 4 a control circuit, 5 a transmission gate circuit, 6 a sweep signal generator, 7 a microwave oscillator, and 8 a transmitting antenna.

FIG. 2 is a perspective view showing a conventional radar transponder. In FIG. 2, reference numeral 9 is a receiving unit which receives an electric wave (a high frequency signal) from a radar not shown in the diagram, 10 a transmitting unit which transmits a response signal in response to the received high frequency signal received by the receiving unit 9, 11 a printed-circuit board, also known and hereinafter referred to as a printed wiring board, for a power source circuit, 12 a printed wiring board for a signal control circuit, 13 a printed wiring board for a video amplifier, 14 a printed wiring board for a lamp LED display circuit, and 15 wirings for connection with each printed wiring board. The above-mentioned printed wiring boards are all ordinary rigid printed wiring boards.

Next, the operation will be described. An electric wave received by the receiving antenna 1 coming from a radar is detected by the diode direct detector 2, the detected output is amplified by the video amplifier 3, and is sent to the control circuit 4. The control circuit 4 forms pulses for creating the transmission time of a radar transponder using an input video amplified signal and transfers the pulses to the transmission gate circuit 5. The transmission gate circuit 5 forms transmission gate pulses using the transferred output pulses from the control circuit, and the transmission gate pulses are input to the sweep signal generator 6 and the microwave oscillator 7. The sweep signal generator 6 generates saw-tooth voltage which wave form consists of a required number of saw-tooth pulses using the transmission gate pulses and transfers them to the microwave oscillator 7. The microwave oscillator 7 performs transmission for a fixed time set by the transmission gate pulses and performs frequency sweep in a regular frequency range using the saw-tooth output voltage. A frequency swept transmitting output from the microwave oscillator 7 is propagated into the space by the transmitting antenna 8.

Since the conventional radar transponder had its receiving wave detecting portion which was only a diode direct detector composed of only detecting diodes as described above, there was a problem that the limit of the minimum receiving sensitivity of the conventional radar transponder was −45 dBm or so.

Furthermore, it was necessary to connect each printed wiring board using wires, and soldering work and wire machining involved much labor.

Moreover, there was a problem that radar transponders did not normally operate owing to forgotten wirings or wrong wirings.

SUMMARY OF THE INVENTION

The present invention is devised to solve the above-mentioned problems and the object thereof is to provide a radar transponder capable of making the minimum receiving sensitivity thereof lower than −50 dBm.

Furthermore, it is also the object of the present invention to provide a radar transponder which prevents bad effect due to sneak paths of a transmitting wave and is able to enhance the reliability of the radar transponder compared with that of the conventional one.

It is a further object of the present invention to suppress unnecessary waveguide electromagnetic field modes within the required frequency band generated in a waveguide formed in the inside of a radar transponder and secure a sufficient receiving sensitivity.

It is still a further object of the present invention to obtain a radar transponder in which the connection of each printed wiring board using wires is not required, allowing soldering work and wire machining to be omitted, and at the same time, so-called "forgotten wirings" and "wrong wiring" to be prevented.

The radar transponder according to the present invention has a FET amplifier inserted between a receiving antenna and a diode direct detector.

The FET amplifier in the present invention comprises a microwave gallium arsenide FET and a microwave integrated circuit (MIC), amplifies an input wave from the receiving antenna, and transfers the amplified output to the diode direct detector.

Further, the radar transponder is so formed as to provide a receiving on/off control circuit of which output level varies in response to the presence or absence of transmission gate pulses and stop the operation of an amplifying circuit connected to the receiving antenna in order to enhance the receiving sensitivity using the output synchronized with the transmission gate pulses from the receiving on/off control circuit.

With such a configuration, since the operation of the amplifying circuit provided in the following stage of the receiving antenna in order to enhance the receiving sensitivity is automatically stopped when transmission starts, the bad effect applied to the receiving unit owing to the sneak paths of the transmitting wave during the transmission is prevented.

Further, the radar transponder according to the present invention mounts amplifying means and detecting means on an antenna housing via an elastic metal body.

The elastic metal body is closely contacted with the antenna housing to form a waveguide having a volume smaller than that of the conventional one, and acts so as to make the required frequency band not higher than its cut-off frequency. By this, unnecessary waveguide electromagnetic field modes within the required band does not occur. Accordingly, unnecessary interferences applied to the amplifying means such as a FET amplifier and the like are removed, thereby allowing the primary performance of the FET amplifier concerned to be obtained and a good receiving sensitivity of the radar transponder to be obtained.

Also, the performance obtained by adjusting the amplifying means and the detecting means in a state under which the both means are mounted on a fixed mounting plate can be easily reproduced after the both means are mounted on the antenna housing.

The radar transponder according to the present invention forms its power source circuit, its signal control circuit, its video amplifying circuit, and its lamp LED display circuit with flexible wrap-around printed wiring boards or assemblies, and at the same time, each connecting wirings for each circuit are formed with flexible wrap-around printed wiring assemblies. Since the connecting wirings for each circuit are also formed with flexible printed wiring assemblies, soldering work and wire machining required for the connection are omitted, thereby allowing forgotten wirings and wrong wirings to be prevented.

DETAILED DESCRIPTION OF THE PREFERRED EMBODIMENT

Figure 3:
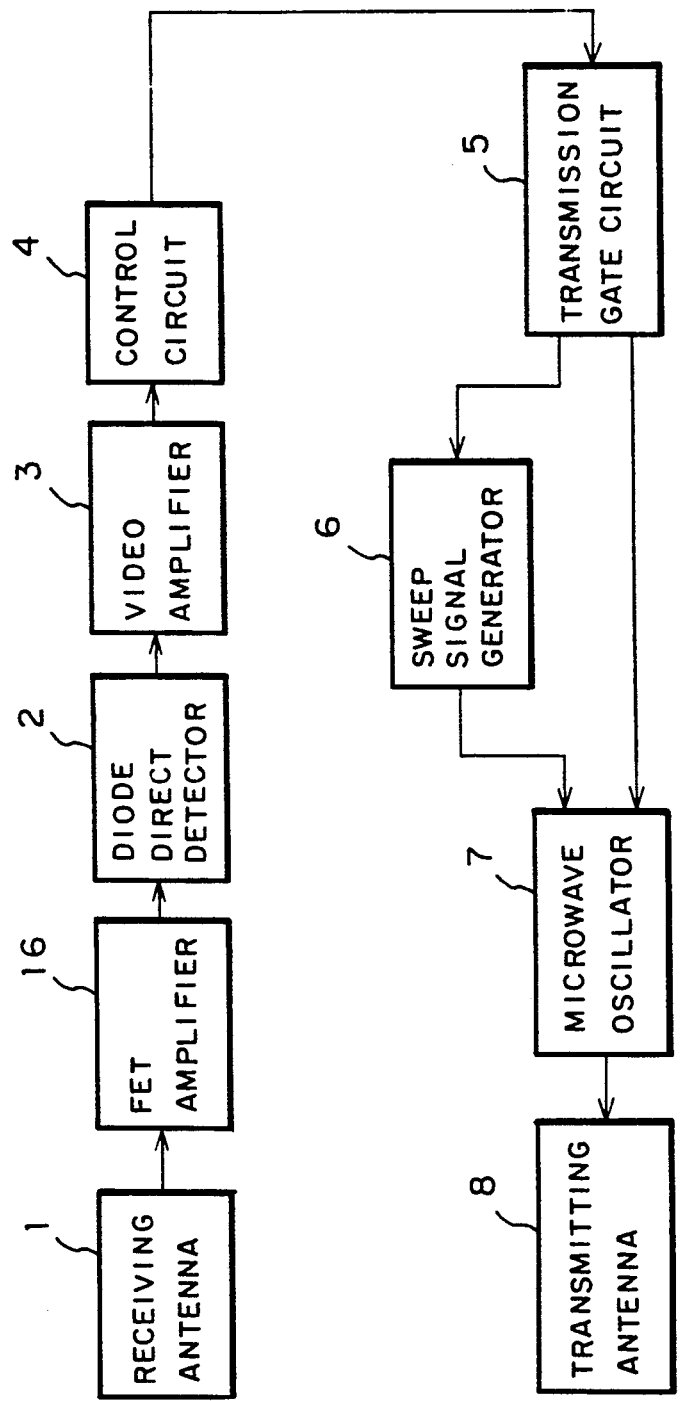
FIG. 3 is a circuit block diagram showing a circuit configuration of a radar transponder of a first embodiment according to the present invention.

The first embodiment according to the present invention will be described with reference to drawings. In FIG. 3, reference numeral 16 is a FET amplifier mounted between a receiving antenna 1 and a diode direct detector 2.

Next, the operation will be described. An electric wave received by the receiving antenna 1 coming from a radar is amplified by the FET amplifier 16, the amplified electric wave is detected by the diode direct detector 2, and the detected output is amplified by a video amplifier 3 and sent to a control circuit 4. The control circuit 4 forms pulses for producing the transmission time of the radar transponder by use of an input video amplified signal and transfers the pulses to a transmission gate circuit 5. The transmission gate circuit 5 forms transmission gate pulses by use of the transferred pulses from the control circuit 4, and the transmission gate pulses are input to a sweep signal generator 6 and a microwave oscillator 7. The sweep signal generator 6 generates saw-tooth voltage which wave form consists of a required number of saw-tooth pulses and transfers the saw-tooth voltage to the microwave oscillator 7. The microwave oscillator 7 performs transmission during the fixed time by use of the transmission gate pulses and performs the frequency sweep of the regular frequency range by use of the saw-tooth output voltage. The frequency swept transmitting output of the microwave oscillator 7 is propagated into space by the transmitting antenna 8.

Though a search-rescue radar transponder has been described in the above-mentioned embodiment, other radar transponders may operate similarly and exhibit the same effect as the above-mentioned embodiment.

Figure 4:
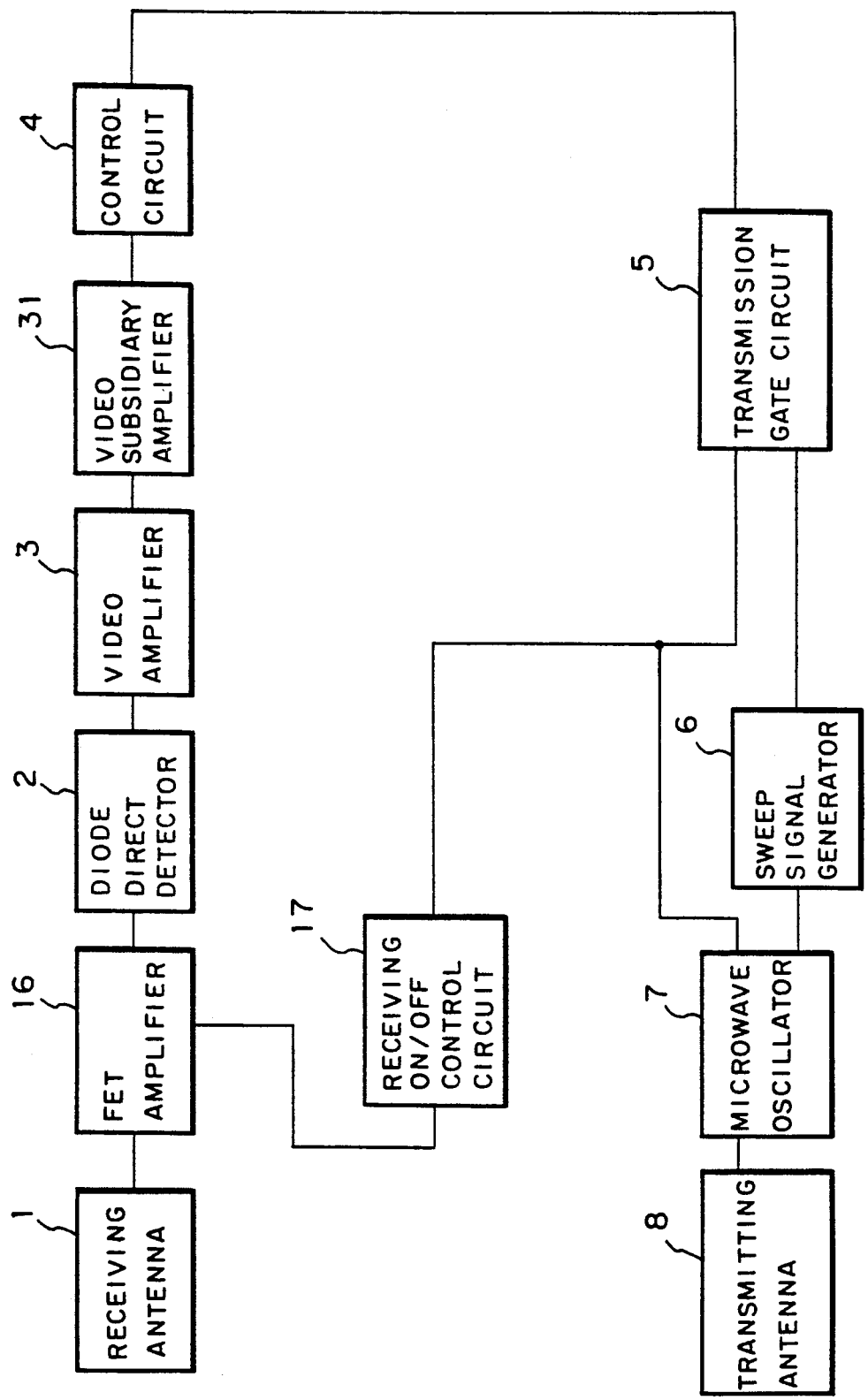
FIG. 4 is a circuit block diagram showing a circuit configuration of a radar transponder of a second embodiment according to the present invention.

FIG. 4 is a circuit block diagram showing a circuit configuration of a radar transponder of a second embodiment according to the present invention. In FIG. 4, reference numeral 17 is a receiving on/off control circuit.

With this configuration, the receiving on/off control circuit 17 provides a bias voltage to the FET amplifier 16 and usually outputs a bias voltage of a certain level. Accordingly, after an electric wave received by the receiving antenna 1 coming from a search radar is amplified by the FET amplifier 16, the electric wave is detected by the diode direct detector 2 and amplified by the video amplifier 3 and next by a video subsidiary amplifier 31 up to the level required for triggering the control circuit 4. When the transmission gate circuit 5 receives pulses from the control circuit 4, it produces the transmission gate pulses. The transmission gate pulses concerned are supplied to the sweep signal generator 6, the microwave oscillator 7, and the receiving on/off control circuit 17. The receiving on/off control circuit 17 operates so as to reduce the output to zero level when the transmission gate pulses concerned are input.

In the radar transponder of the present embodiment, therefore, when the transmission gate pulses are output from the transmission gate circuit 5, and the transmission of an electric wave starts from the transmitting antenna 8, the bias of the FET amplifier 16 concerned is made to be zero level during the period when the pulse of the transmission gate pulses exists. As a result, the amplifying operation of the FET amplifier 16 concerned is stopped, and signal input to the diode direct detector 2—the video amplifier 3—the video subsidiary amplifier 31 is cut off substantially.

On the other hand, when the sweep signal generator 6 receives the transmission gate pulses, it generates voltage which wave form consists of a required number of saw-tooth pulses and sends out the saw-tooth voltage to the microwave oscillator 7. The microwave oscillator 7 performs transmission for the fixed time by use of the transmission gate pulses and performs frequency sweep in the regular frequency range by use of the saw-tooth voltage. The frequency swept transmitting output of the microwave oscillator 7 is propagated into the space by the transmitting antenna 8.

In this way, in the present embodiment, since the operation of the FET amplifier 16 is stopped during transmission of an electric wave, the transmitting wave does not enter into the receiving antenna 1 by forming sneak paths at all, and the transponder is brought into a state ready to receive an electric wave from a search radar immediately after the transmission period is completed.

Incidentally, in the above-mentioned embodiment, though a search-rescue radar transponder has been described, it is apparent that the same effect can be obtained by applying the present invention to any other radar transponder if the radar transponder is provided with an amplifying circuit for enhancing the receiving sensitivity.

Figure 5:
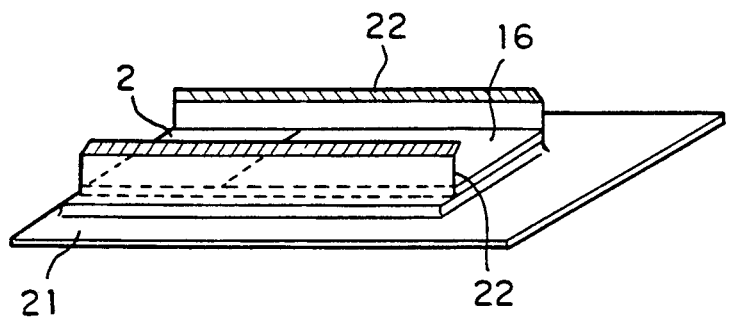
FIG. 5 is a partial perspective view showing a part of a springy metal wall with slits mounted on a MIC mounting plate of a transponder of a third embodiment according to the present invention.
Figure 6:
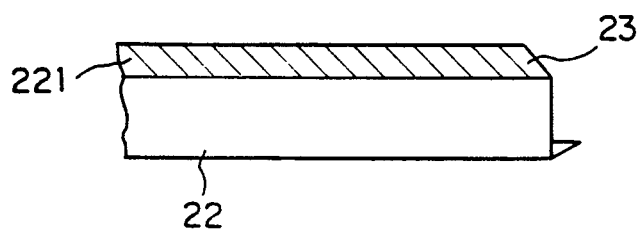
FIG. 6 is a detailed diagram showing the springy metal wall with slits shown in FIG. 5 in detail.

Next, the third embodiment according to the present invention will be described. FIG. 5 is a partial perspective view of a radar transponder in which a springy metal wall with slits is mounted on a MIC mounting plate. In FIG. 5, reference numeral 22 is a springy metal wall with slits as an elastic metal body which is provided at both sides on the diode direct detector 2 in the longitudinal direction and mounted on the upper part of the MIC mounting plate 21. FIG. 6 is a detailed drawing of the springy metal wall 22 with slits, and reference numeral 23 are a plenty of slits provided at the folded portion 22 of the upper side of the springy metal wall 22 with slits in order to give resilience to the metal wall.

Figure 7:
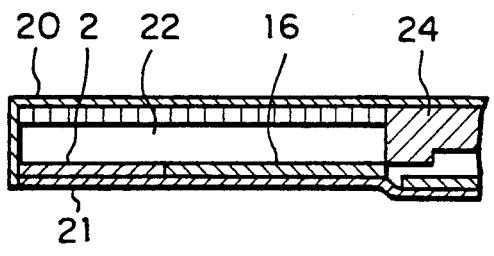
FIG. 7 and FIG. 8 are partial sectional views showing a receiving unit of the transponder of the third embodiment according to the present invention.
Figure 8:
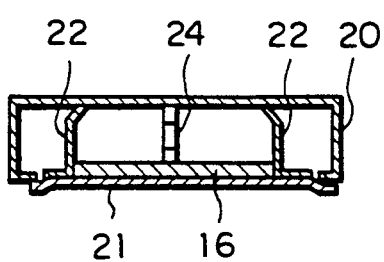

FIG. 7 is a sectional view showing a state in which the MIC mounting plate 21 having the springy metal wall 22 with slits mounted thereon is further mounted on the antenna housing 20, and FIG. 8 is a side sectional view of FIG. 7.

Next, the operation of FIG. 5 will be described. The radar electric wave received by a receiving antenna (not shown) is converted from the electric wave propagation mode in a waveguide composed of the antenna housing 20 and the MIC mounting plate 21, that is, the TE mode to the electric wave propagation mode in the MIC portion, that is, the TEM mode by a ridge conversion unit 24. After the mode-converted electric wave concerned is amplified by the FET amplifier connected to the ridge conversion unit 24 by soldering and the like, it is converted into a DC detected output by the diode direct detector 2. The DC detected output concerned is further amplified by the video amplifier (not shown), and the amplified output triggers the control circuit (not shown), thereby opening the transmission gate of the transmission gate circuit (not shown) and transmitting a response electric wave.

In this case, since the springy metal wall 22 with slits is provided on the both sides of the FET amplifier 16 and the diode direct detector 2 in the longitudinal direction and mounted on the MIC mounting plate 21 as shown in FIG. 5, if the metal wall 22 is assembled with the antenna housing 20 to form an unitary body as shown in FIG. 7 and FIG. 8, the springy metal wall 22 with slits is closely contacted with the antenna housing 20 by the aid of resilience based on the slits 23 to make perfect high frequency contact to the antenna housing 20 and to form a waveguide having a volume smaller than that of a conventional one. In this way, since the construction of the waveguide formed by the springy metal wall 22 with slits functions so that the required frequency band becomes not higher than the cut-off frequency, it does not generate unnecessary waveguide electromagnetic field mode at all. Accordingly, unnecessary interferences applied to the FET amplifier 16 are removed, thereby allowing the performance inherent to the FET amplifier 16 to be obtained.

Such a radar transponder that the performances of the FET amplifier 16 and the diode direct detector 2 obtained by the adjustment after they are mounted on the MIC mounting plate 21 can be also easily reproduced after mounting them to the antenna housing 20 can be obtained.

Incidentally, in the above-mentioned embodiment, though an example in which the springy metal wall 22 with slits is mounted on the MIC mounting plate 21 with the metal wall 22 held in a state as shown in FIG. 5 is shown, the springy metal wall 22 with slits may be mounted on the antenna housing 20 with the metal wall 22 held upside down.

In the above-mentioned embodiment, the slits 23 are formed on the end of the metal wall 22. But, the gist is that the whole of the metal wall 22 has resilience. Accordingly, the metal wall 22 concerned may form slits 23 with various shapes at the central portion thereof. Further, if the metal wall 22 has resilience as a whole, a metal body implemented so as to obtain resilience using other means such as, for example, the means that the whole of the metal wall 22 is formed so as to be spring-shaped may be used without restriction to the embodiment in which slits are disposed at one portion of the metal wall concerned 22.

In the above-mentioned embodiment, though the FET amplifier 16 is used as an amplifying means, other amplifiers such as a travelling-wave tube amplifier may be employed. Furthermore, though the diode direct detector 2 is used as a detecting means, other kinds of detectors may be employed.

As described above, according to the present embodiment, since in a radar transponder having a receiving unit equipped with an amplifying means and a detecting means, the radar transponder is configurated so as to mount its amplifying means and detecting means via a metal body having resilience on the antenna housing, unnecessary waveguide electromagnetic field modes within the band are removed. This leads to the result that inherent performance as an amplifying means, for example, that of the FET amplifier can be obtained and a radar transponder having a good receiving sensitivity can be obtained. Also, this leads to the result that there can be obtained such a radar transponder as the inherent performances as an amplifying means and as a detecting means, for example, those of the FET amplifier and of the diode direct detector 2 obtained by adjusting the both means on the fixed mounting plate can be easily reproduced after mounting these means on the antenna housing.

Figure 1:
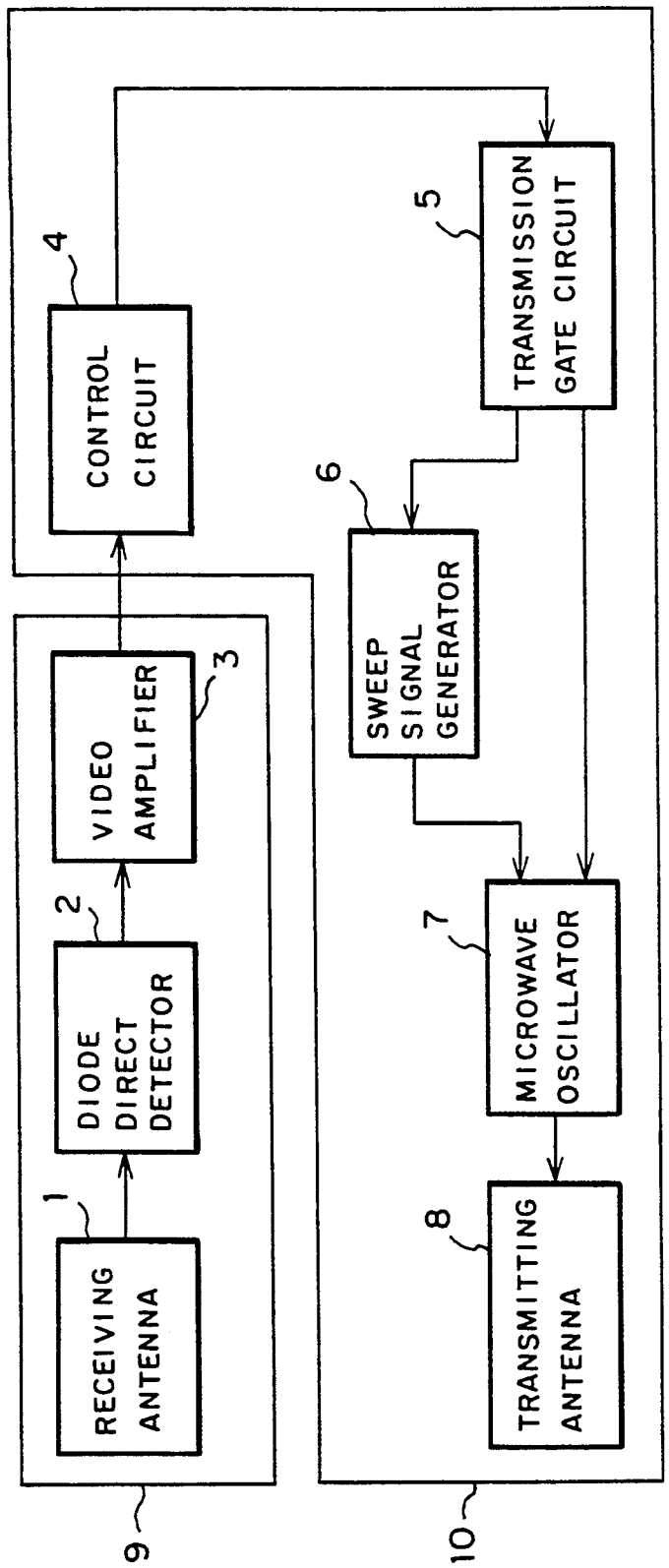
FIG. 1 is a circuit block diagram showing a circuit configuration of a conventional radar transponder.
Figure 2:
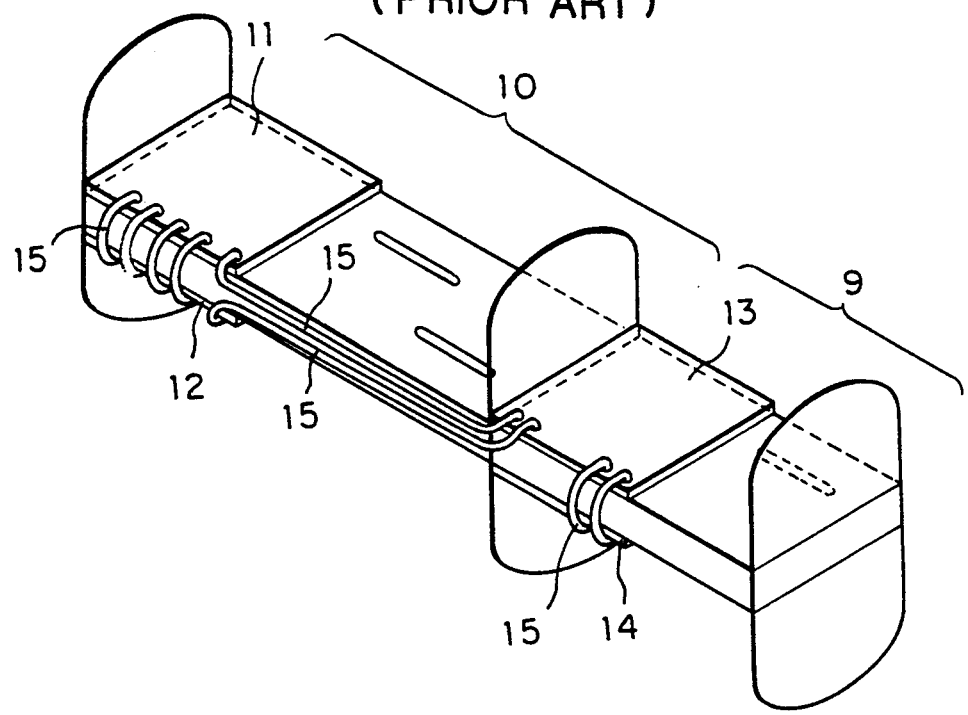
FIG. 2 is a perspective view showing a construction of the conventional radar transponder.
Figure 9:
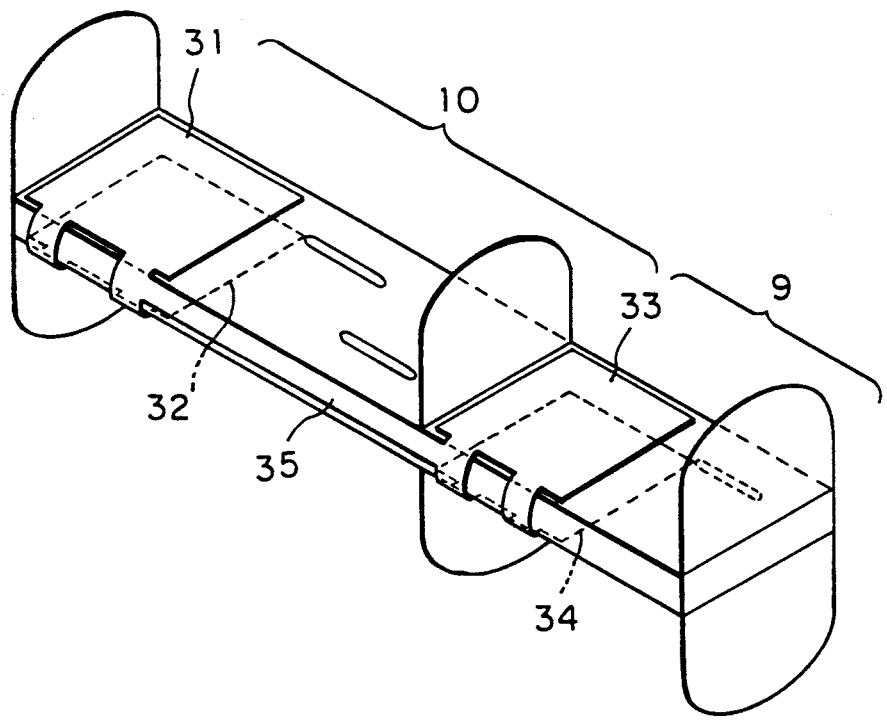
FIG. 9 is a perspective view showing a construction of a radar transponder of a fourth embodiment according to the present invention.

FIG. 9 is a perspective view showing a construction of a radar transponder of a fourth embodiment according to the present invention. In FIG. 9, reference numeral 31 is a flexible wrap-around printed wiring board for a power source, 32 a flexible wrap-around printed wiring board for a signal control circuit, 33 is a flexible wrap-around printed wiring board for a video amplifier, 34 a flexible wrap-around printed wiring board for a lamp LED display circuit, and 35 is a flexible wrap-around printed wiring board for the connecting wires associated with each of these circuits.

Next, the operation of the fourth embodiment will be described. In the same way as the conventional device, an electric wave (a high frequency signal) coming from a radar (not shown) is received by the receiving unit 9 and directly detected. The directly detected output from the receiving unit 9 is amplified by the video amplifier formed on the flexible printed wiring board 33 for the video amplifier, and on the other hand, simultaneously in receiving the above-mentioned wave, a response transmission signal and a transmitting frequency modulation signal are produced in the signal control circuit formed on the flexible printed wiring board 32 for the signal control circuit, and then these signals are input to the transmitting unit 10.

The transmitting unit 10 outputs a high frequency response signal when the above-mentioned signals are input thereto, and propagates the same response signal into the space to transmit them to radars and the like.

Incidentally, though the radar response device has been described in the above-mentioned embodiment, the above-mentioned configuration is applicable to other microwave transponse devices and the like, and exhibits the same effect as the above-mentioned embodiment.

Further, though the configuration in which each circuit is formed integrally with the flexible printed wiring board 35 for connection wirings is adopted in the above-mentioned embodiment, each circuit may be divided for convenience of selection of boards, and even if each circuit is formed by an ordinary rigid printed wiring board and only the printed wiring board 35 for connection wirings is a flexible wrap-around type printed wiring board or assembly, the same effect as the above-mentioned embodiment can be obtained.

What is claimed is:

1. A radar transponder having a receiving unit which is responsive to electric waves emitted from a radar and a transmitting unit which transmits a signal in response to the reception of said electric waves by said receiving unit, comprising:
   a power source circuit, a signal control circuit, a video amplifying circuit and a lamp LED display circuit, all formed on a respective deformable flexible wrap-around printed wiring board,
   wherein wiring connections between said power source, said signal control circuit and said video amplifying circuit, and said lamp LED display circuit are formed on at least one other deformable flexible wrap-around printed wiring board, and
   additionally including a support member having a pair of opposing support surfaces, and wherein said power source circuit and said signal control circuit are formed on first and second deformable flexible wrap-around printed wiring boards respectively located on said pair of opposing support surfaces and wherein said video amplifying circuit and said lamp LED display circuit are formed on third and fourth deformable flexible wrap-around printed wiring boards respectively located on said pair of opposing support surfaces a predetermined distance away from said first and second deformable flexible wrap-around printed wiring board.

2. The radar transponder according to claim 1 wherein said first and second deformable flexible wrap-around printed wiring boards are located in proximity to one end of said support member and wherein said third and fourth deformable flexible wrap-around printed wiring boards are located in proximity to the other end of said support member.

3. The radar transponder according to claim 1 wherein said at least one other deformable flexible wrap-around printed wiring board including said wiring connections includes a deformable elongated flexible wrap-around printed wiring board interconnecting said first and second deformable flexible wrap-around printed wiring board with said third and fourth deformable flexible wrap-around printed wiring board.

4. The radar transponder according to claim 3 wherein said support member includes an elongated side surface intermediate said pair of opposing support surfaces and wherein said elongated deformable flexible wrap-around printed wiring board is located along said side surface.

5. The radar transponder according to claim 4 wherein said at least one other deformable flexible wrap-around printed wiring board including said wiring connections includes at least one deformable flexible printed wiring board portion spanning said side surface to interconnect said first and second deformable flexible wrap-around printed wiring board and at least one other deformable flexible printed wiring board portion spanning said side surface to interconnect said third and fourth deformable flexible wrap-around printed wiring board.

6. A radar transponder having a receiving unit which is responsive to electric waves emitted from a radar and a transmitting unit which transmits a signal in response to the reception of said electric wave by receiving unit, comprising:
   a power circuit, a signal control circuit, a video amplifying circuit and a display circuit, all formed on a respective flexible wrap-around printed circuit board,
   wherein wiring connections between said power source circuit, said signal control circuit, said video amplifying circuit and said display circuit are formed on at least one other flexible wrap-around printed wiring board, and
   additionally including a support member having a pair of opposing support surfaces, and wherein said power source circuit and said signal control circuit are formed on first and second said flexible wrap-around printed wiring boards respectively located on said pair of opposing support surfaces and wherein said video amplifying circuit and said display circuit are formed on third and fourth said flexible wrap-around printed circuit boards respectively located on said pair of opposing support surfaces a predetermined distance away from said first and second wiring boards.

7. The radar transponder according to claim 6, wherein said first and second flexible wrap-around printed wiring boards are located in proximity to one end of said support member and wherein said third and fourth flexible wrap-around printed wiring boards are located in proximity to the other end of said support member.

8. The radar transponder according to claim 6, wherein said at least one other flexible wrap-around printed wiring board including said wiring connections includes an elongated flexible wrap-around printed wiring assembly interconnecting said first and second wrap-around printed wiring boards with said third and fourth flexible wrap-around printed wiring boards.

9. The radar transponder according to claim 8 wherein said support member includes an elongated side surface intermediate said pair of opposing support surfaces and wherein said elongated flexible wrap-around printed wiring board is located along said side surface.

10. The radar transponder according to claim 9 wherein said at least one other flexible wrap-around printed wiring board including said wiring connections includes at least one flexible printed wiring board portion spanning said side surface to interconnect said first and second flexible wrap-around printed wiring board and at least one other flexible printed wiring board portion spanning said side surface to interconnect said third and fourth flexible wrap-around printed wiring board.

* * * * *